INVENTOR
BILLY BURLEY
KARLHEINZ JOEL

BY Scrivener & Parker
ATTORNEYS

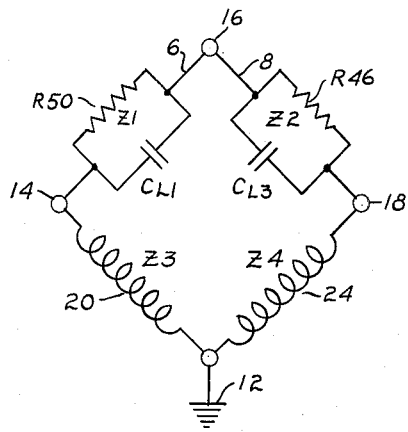
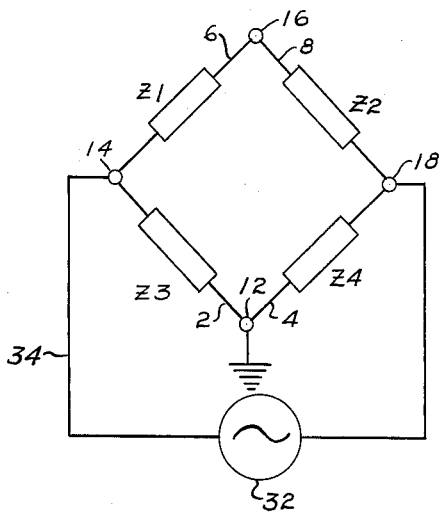
Fig. 3
Fig. 4
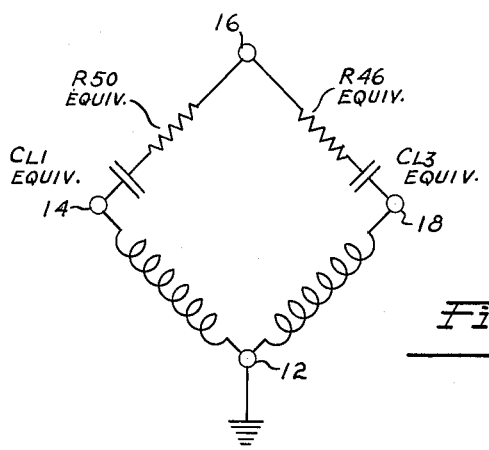
Fig. 5
INVENTOR
BILLY BURLEY
KARLHEINZ JOEL
BY *Scrivener & Parker*
ATTORNEYS

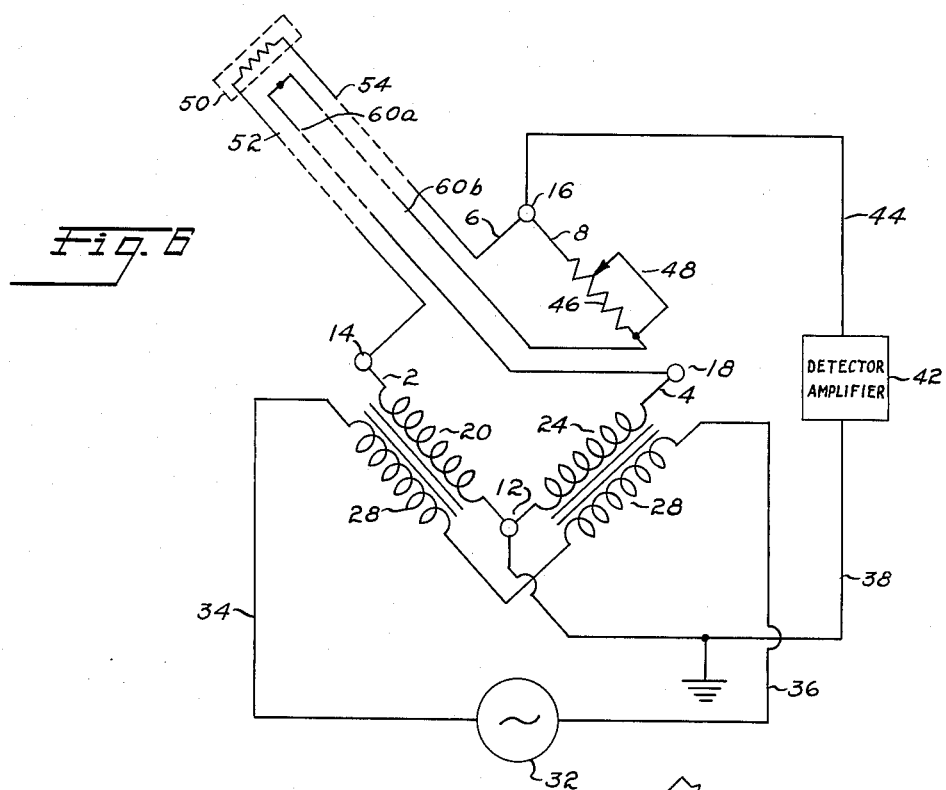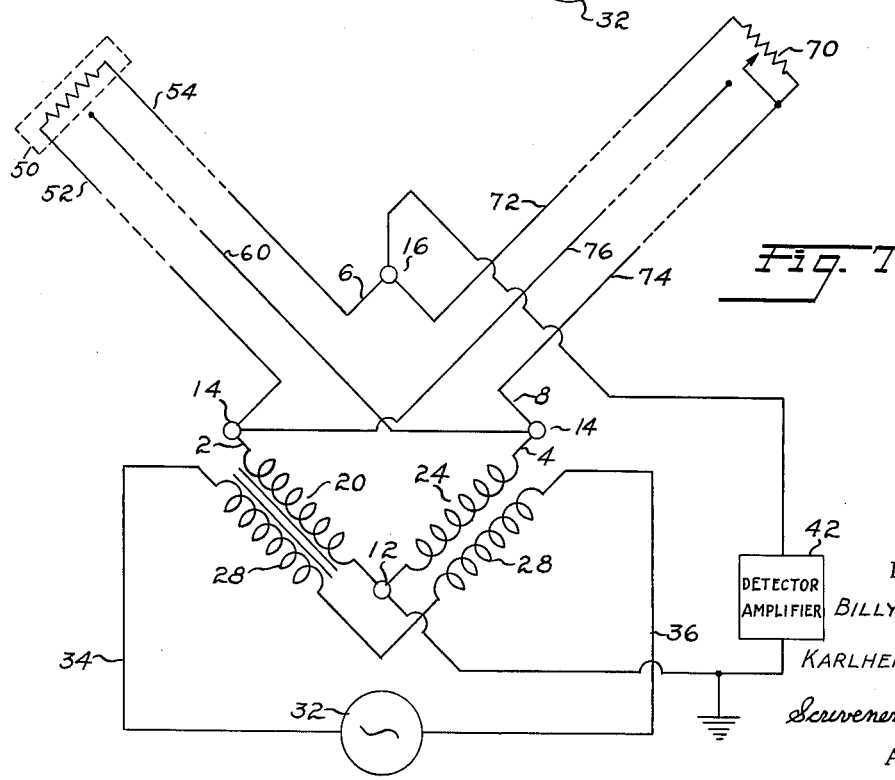

United States Patent Office 3,225,297
Patented Dec. 21, 1965

3,225,297
WHEATSTONE BRIDGE CIRCUIT FOR THE MEASUREMENT OF A PHYSICAL VARIABLE REMOTE FROM THE BRIDGE, WITH COMPENSATING MEANS FOR INTERLEAD CAPACITANCE
Billy Burley and Karlheinz Joel, Dallas, Tex., assignors, by mesne assignments, to Johnson Service Company, Milwaukee, Wis., a corporation of Wisconsin
Filed Jan. 6, 1961, Ser. No. 81,179
7 Claims. (Cl. 324—62)

This invention relates generally to alternating current bridge circuits of the type operated by a source of power of low frequency, which is preferably power line frequency.

The invention relates, more particularly, to such a bridge circuit which is used for the measurement of some physical variable, such as temperature, humidity, pressure motion or the like, at a point or in a space substantially removed from the bridge circuit itself. In any such system for measurement or control, the sensing element which is located at the point or in the space to be monitored or controlled must be connected by leads of substantial length to the remaining parts of the bridge circuit. These long leads have substantial inter-lead and lead-to-ground capacitances which produce false, or error, signals resulting in erroneous measurement or control of the physical variable.

In using such a bridge circuit for the accurate and sensitive measurement or control of such variables at a remote location, it is therefore necessary to reduce or to compensate the amount of false or error signals caused by the inherent inter-lead and lead-to-ground capacitive effects of the wires connecting the remotely located sensing element to the bridge circuit. While such reduction or compensation can be achieved through the proper application of balance capacitors or automatic electronic circuits, these methods are relatively expensive and complicated if maximum sensitivity, as it is offered ideally by a bridge circuit, must be obtained.

It is therefore the principal object of this invention to provide an alternating current bridge circuit having a remotely located sensing element or a remotely located sensing element and calibrating element, including new and improved means for effectively reducing or substantially eliminating the inter-lead and lead-to-ground capacitive effects, this reduction being effective over a wide range of operating conditons, while using sensing elements of either very high, medium or very low impedance values, thus producing accurate and highly sensitive measurement or control.

A further object of the invention is to provide a simple alternating current operated bridge circuit in which the inter-lead and lead-to-ground capacitances are effectively compensated for every possible null condition of the bridge.

The invention is described in the following specification and is illustrated in the accompanying drawing, in which:

FIGS. 2, 3, 4 and 5 are simplified diagrammatic representations of the prevailing circuit conditions with regard to inter-lead and lead-to-ground capacities;

FIG. 6 is a circuit diagram of a simple bridge circuit embodying compensation for both lead capacitance and resistance, and FIG. 7 is a circuit diagram of a simple bridge circuit embodying a remotely located set point or calibration element in addition to a remotely located sensing element, the location of the remotely located set point or calibration element being different from that of the sensing element.

Figure 1:
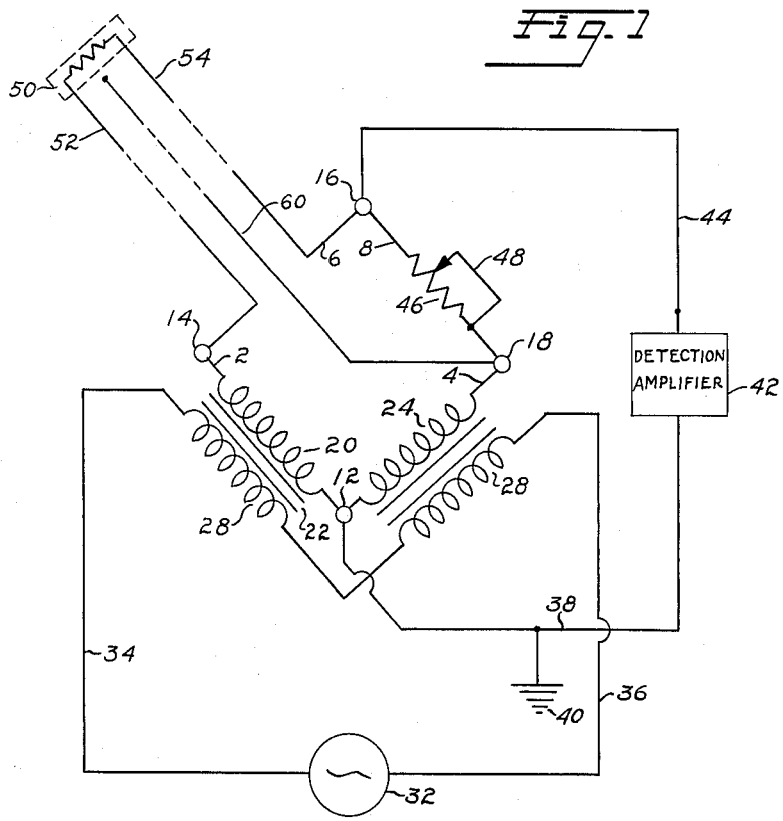
FIG. 1 is a circuit diagram of a bridge circuit with a three-wire lead arrangement embodying the features of this invention.

There is disclosed in FIG. 1 of the drawings a Wheatstone bridge circuit according to the invention, including a sensing element located remotely from the remaining parts of the bridge circuit and including, in addition, means for compensating for the inter-lead and lead-to-ground capacitances of the wires connecting the sensing element to the remaining parts of the bridge circuit. The bridge circuit comprises arms 2, 4, 6 and 8, the arms 2, 4 being connected at terminal 12, the arms 2, 6 being connected at terminal 14, the arms 6, 8 being connected at terminal 16, and the arms 4, 8 being connected at terminal 18. Arm 2 consists of the secondary winding 20 of a transformer 22, while arm 4 consists of the secondary winding 24 of the transformer 22, the terminal 12 being a center tap in this secondary winding. The primary winding 28 of the transformer 22 is connected to an alternating current source 32 by leads 34, 36. Terminal 12, which connects arms 2, 4, is connected by lead 38 to ground at 40 and to one terminal of a phase sensitive detector-amplifier 42, the other terminal of which is connected by lead 44 to bridge terminal 16. Bridge arm 8 comprises an adjustable resistance element 46, the value of which is adjustable by wiper 48.

A remotely located sensing element 50 is connected in bridge arm 6 by long leads 52, 54 which are connected at their outer, or remote, ends to the opposite terminals of the sensing resistance 50 and, at their other ends, to the bridge terminals 14, 16, respectively. The broken lines forming parts of these leads 52, 54 indicate the remote position of the sensing element 50 with respect to the remaining parts of the bridge circuit.

It is well known to those experienced in the arts to which this invention relates that long leads, such as leads 52, 54, produce disturbing effects of such a nature that a true null condition of the bridge circuit cannot be obtained by manipulation of resistance wiper 48 alone. These disturbing effects are the lead-to-lead and lead-to-ground capacitance effects produced between and by the long leads 52, 54, which effects are disturbing to the proper and accurate operation of the bridge circuit because of the lengths of these leads. Heretofore, these capacitance effects have been eliminated or compensated in various ways, for example by the provision of an adjustable capacitance in parallel with bridge arm 8 which was made adjustable to balance the undesired capacitance effects of the long leads or, otherwise, by the provision of an automatic electronic circuit which continues to compensate for the described capacitance effects of the long leads. The disadvantage of the first compensating means is that, for varying resistance values of the sensing element 50, varying values of the compensating capacity must be employed in order to achieve effective compensation. The second means, while technically practical, is complicated and expensive.

Means are provided by the invention for compensating for the lead-to-lead and lead-to-ground capacitance effects of the long leads 52, 54 which connect the remote sensing element to the remaining parts of the bridge circuit, which means do not require the provision of a compensating capacitance having varying value and which, in addition, are neither complicated or expensive. Furthermore, the compensating action of the capacitance compensating means provided by the invention is independent of the respective values of the resistance of the sensing element 50 and the resistance element 48 for any possible bridge balance condition. Such means provided by the invention comprise a lead 60 which is connected at its one end to terminal 18 of the bridge circuit and which is extended alongside and close to leads 52, 54 which connect the sensing element 50 to bridge terminals 14, 16. This lead 60 has substantially the same physical and electrical properties as leads 52, 54. At its outer end adjacent the sensing resistance 50 the lead 60 is terminated to provide an open circuit connection, whereby a compensating lead-to-ground capacitance and lead-to-lead capacitance are provided without loading the bridge circuit and causing error to be introduced therein.

The third lead 60 provides lead-to-lead capacitance with leads 52, 54 and lead-to-ground capacity. These capacities are in parallel with the lead-to-lead and lead-to-ground capacitances of bridge arm 6 and therefore effectively and completely compensate for such capacitances. This compensating action is independent of the respective values of the resistances of the sensing element 50 and resistance element 46 for any possible bridge balance condition by virtue of the open circuit condition of the remote end of the lead 60.

Figure 2:
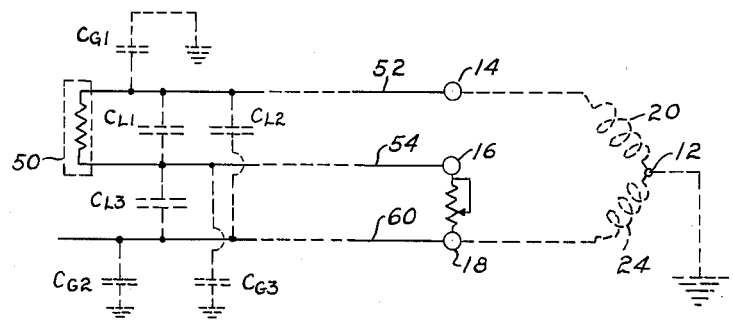

The principles involved in the compensating action of the lead 60 are illustrated in FIGURES 2, 3, 4 and 5. FIGURE 2 shows the bridge and sensing element circuit diagrammatically and, in addition, shows in dotted lines the inter-lead capacitances CL1, CL2 and CL3 between leads 52, 54 and 52, 60 and 54, 60 respectively, and the lead-to-ground capacitances CG1, CG2 and CG3 of leads 52, 60 and 54 respectively. Measurements show that the inter-lead capacitances are of sufficiently equal values that substantially complete compensation is achieved, and that the lead-to-ground capacitances are also so equal in value as to achieve substantially full compensation. In addition, the lead-to-ground capacitances are also substantially smaller in magnitude than the inter-lead capacitances, especially if unshielded wires are used.

The effects of lead-to-ground capacities is further reduced, as will be seen clearly from FIGURE 2, by connecting two of these capacities CG1 and CG2 with the low impedances of the transformer secondary windings 20 and 24, and connecting the junction of these secondaries to earth ground. The remaining capacity CG3 is connected in parallel to the bridge output terminals 12, 16 and does not influence the sensitivity of the measurements at the low frequencies used for operation of the bridge.

The addition of the third lead 60 in the bridge circuit will automatically provide the correct value of a compensating capacitance CL3 in parallel with bridge arm 8 to effectively compensate for the lead capacitance CL1 of bridge arm 6.

With the aid of FIGURES 3 and 4 and using the basic bridge equation:

$$-\frac{Z1}{Z3} = \frac{Z2}{Z4}$$

it can be demonstrated that a compensating capacitance of fixed value cannot suffice for a perfect bridge balance if it is connected in parallel with a bridge arm exhibiting resistive values which are not changing in the same manner as the variable sensing element.

Impedances Z1 and Z2 in FIGURE 3 are representative of the impedances in arms 6 and 8 of the bridge circuit and, as shown in FIGURE 4, are formed by a parallel circuit of a variable resistance R50 and lead capacitance CL1 in arm 6 and resistance R46 and lead capacitance CL3 in arm 8. In this embodiment of the invention, impedance Z3 is equal to impedance Z4, said impedances being formed by two electrically identical transformer secondary windings, and for bridge balance Z1 must therefore equal Z2.

In FIGURE 5 the parallel circuits of resistance R50 and CL1, as well as the parallel circuit of resistance R46 and CL3, have been conventionally transformed into the electrically equivalent series circuit according to the equations:

$$Z1 = \frac{R50}{1+(R50\omega CL1)^2} - j\frac{R50^2 \omega CL1}{1+(R50\omega CL1)^2}$$

$$Z2 = \frac{R46}{1+(R46\omega CL3)^2} - j\frac{R46^2 \omega CL3}{1+(R46\omega CL3)^2}$$

This first part of each expression represents the resistive component of the impedance Z1 or Z2 and the second part correspondingly represents the reactive component of each impedance. It is evident that a resistive change in either bridge arm will also change the equivalent reactive part of the corresponding bridge arm. The inter-lead capacitances CL1 and CL3 being very nearly of equal magnitude, it is therefore necessary for accurate bridge balance to make the resistive parts of the adjoining bridge arms equal for any possible balance condition given by the range of the sensing element. A calibration or balance control element located in other possible positions of the bridge circuit, and not being electrically parallel with the induced second lead capacity CL3, will not make it possible to balance the bridge throughout its range.

Generally stated with respect to this first embodiment of the invention, the inter-lead capacity of wires connecting a remotely located and variable sensing element to one arm of an alternating current operated bridge is compensated by a second inter-lead capacitance of equal magnitude, said second capacitance being effectively in parallel with an adjustable element, said adjustable element having the same electrical properties as the variable sensing element, in addition to being located in an electrically opposing arm of the bridge. Thus, by the described simple and unique circuit, compensating action is achieved, the compensation being in effect for a wide range of circuit configurations and null disturbing effects.

In FIGURE 6 a slightly modified form of the bridge circuit is shown in which additionally to capacitance compensation, compensation for lead resistance is provided. The underlying principle is well known to those experienced in the art and further explanation is not necessary.

Rather than leaving the third lead 60 in open circuit condition and only half as long as the combined leads 52 and 54, the third lead 60a, 60b is formed as a part of the series connected bridge arm 8 between terminals 16 and 18 and substantially equal in length to the combined leads 52 and 54, since the third lead 60 has been doubled as shown to include leads 60a and 60b. If these leads have the same resistance per-linear-foot characteristic as the leads 52 and 54, then the resistance error introduced in each of the bridge arms 6 and 4 is the same and will therefore be balanced out. Thus, the terms in the impedance equations are made more nearly equal.

In FIGURE 7 still another embodiment of the invention is shown. In addition to the remotely located sensing element 50, a set point, or calibration resistance element 70 is also remotely located. Connection of bridge arm 8 to the remote calibration element is achieved by means of the leads 72, 74. Again, capacitance compensation of the inter-lead capacitance of leads 72, 74 is achieved by providing a third lead 76 connected at one end to the bridge vortex 14 and being located close to and alongside leads 72, 74. This provides automatic compensation for lead resistance if the combined length of leads 52 and 54 is equal to the combined length of leads 72 and 74. The use of symmetrically disposed third leads 60 and 76 with their remote ends open circuited supplies a balance of lead-to-lead and lead-to-ground capacitance for both of the bridge arms involved. Thus both the necessary resistive and capacitive compensations are inherent in this embodiment.

As can be seen from the foregoing specification and drawings this invention provides a bridge circuit for remote measuring applications wherein stray capacitance and resistance affects such as are peculiar to remote sensing and calibrating applications are inherently compensated for by the novel bridge configurations.

While I have described and illustrated several embodiments which my invention may take, it will be understood by those skilled in the art to which the invention relates that other embodiments, as well as modifications of those disclosed, may be made and practiced without departing in any way from the spirit or scope of the invention, for the limits of which reference must be made to the appended claims.

What is claimed is:

1. A bridge circuit comprising a first arm having a pair of terminals, a remotely located condition responsive variable element connected between the terminals of said first arm by a pair of elongated leads, a second arm having a pair of terminals one of which is a common terminal with said first arm and includes a second variable element for balancing out variations in said first variable element, third and fourth arms completing the bridge circuit, means for energizing the bridge circuit, and means for compensating for the lead-to-lead and lead-to-ground capacitances of said pair of elongated leads comprising at least one elongated lead disposed adjacent and coextensive with said pair of elongated leads and terminating at one end in an open circuit connection immediately adjacent said first variable element and connected at the other end to the terminal of said second arm opposite said common terminal.

2. A bridge circuit comprising a first arm having a pair of terminals, a remotely located condition responsive variable element connected between the terminals of said first arm by a pair of elongated leads, a second arm having a pair of terminals one of which is a common terminal with said first arm and includes a second variable element for balancing out variations in said first variable element, means for compensating for the lead-to-lead and lead-to-ground capacitances of said elongated leads comprising an elongated lead disposed adjacent and coextensive with said pair of elongated leads and terminating at its one end in an open circuit connection immediately adjacent said first variable element and connected at its other end to the terminal of said second arm opposite said common terminal, a power source and transformer for providing electrical power for said bridge circuit, said transformer comprising a primary winding connected across said source and a pair of electrically matched secondary windings connected in series between those terminals of said first and second bridge arms which do not include said common terminal, said secondary windings having a second common terminal therebetween which is connected at ground potential, and a detecting and indicating means connected between said first and second common terminals whereby the conditions of balance and unbalance between said first and second variable elements may be determined.

3. A bridge circuit comprising a first arm having a pair of terminals, a remotely located condition responsive variable element connected between the terminals of said first arm by a pair of elongated leads, a second arm having a pair of terminals one of which is a common terminal with said first arm and includes a second variable element for balancing out variations in said first variable element, said second variable element being connected at its one end to said common terminal and having a second end, third and fourth arms connected in series between said first and second arms and completing the bridge circuit, said third arm being connected to the second end of the second variable element, means for compensating for the stray impedance introduced in said bridge circuit by said pair of elongated leads comprising a second pair of elongated leads connected in series between the second end of said second variable element and the adjacent connection to the third bridge arm to form a part of the second bridge arm, said second pair of elongated leads being adjacent and coextensive with said first pair of elongated leads and symmetrically disposed with respect thereto whereby the resistive and reactive components of said stray impedance introduced by said first pair of elongated leads are balanced out.

4. The bridge circuit of claim 3 having a power source and transformer for providing electrical power to said bridge circuit, said transformer comprising a primary winding connected across said source and a pair of electrically matched secondary windings connected as said third and fourth arms with a common terminal at the junction of the windings, the common terminal of said secondary windings being connected at ground potential, and a detecting and indicating means connected between the common terminals of the first and second arms and of the third and fourth arms whereby the conditions of balance and unbalance between said first and second variable elements may be determined.

5. A bridge circuit comprising first and second arms having a common terminal, each of said arms also having another terminal, a first remotely located condition responsive variable element connected between the terminals of said first arm by a first pair of elongated leads, a second variable element remotely located at a different location than said first element for balancing out variations in said first element, said second variable element being connected between the terminals of said second arm by a second pair of elongated leads, means compensating for the lead-to-lead and lead-to-ground capacitances of each of said pairs of elongated leads comprising two additional elongated leads each of which is coextensive with one of the pairs of elongated leads connected into said first and second arms, each of said additional leads terminating at one free end in an open circuit connection immediately adjacent the variable element of the associated arm and being connected at its other end with said other terminal of the other arm, and third and fourth arms connected between said other terminals for completing the bridge circuit.

6. A bridge circuit comprising first and second arms having a common terminal, each of said arms also having another terminal, a first remotely located condition responsive variable element connected between the terminals of said first arm by a first pair of elongated leads, a second variable element remotely located at a different location than said first element for balancing out variations in said first element, said second variable element being connected between the terminals of said second arm by a second pair of elongated leads, means compensating for the lead-to-lead and lead-to-ground capacitances of each of said pairs of elongated leads comprising a pair of additional elongated leads each of which is coextensive with one of the pairs of elongated leads of said first and second arms, each of said additional leads terminating at one free end in an open circuit connection immediately adjacent the variable element of the associated arm and being connected at its other end with said other terminal of the other arm, third and fourth arms connected between the other terminals of said first and second arms for completing the bridge circuit, a power source and transformer for providing electrical power to said bridge circuit, said transformer comprising a primary winding connected across said source, a pair of electrically matched secondary windings connected in series between said other terminals of said first and second arms and having a common terminal therebetween which is connected at ground potential, and a detecting and indicating means connected between said two common terminals whereby the conditions of balance and unbalance between said first and second variable elements may be determined.

7. An alternating current bridge circuit comprising a condition-responsive variable electrical element connected as one arm of the bridge circuit by a pair of elongated leads whereby the element may be remotely located, a second variable electrical element forming an adjacent second arm of the bridge circuit to that of the first arm, a first impedance means connected to the variable electrical element and forming a third arm of the bridge, a second impedance means connected between the first impedance means and the second variable electrical element to form the fourth arm of bridge circuit, and means for compensating for the capacitive effects of the pair of elongated leads connected to the condition-responsive variable electrical element and comprising compensating lead means interconnected in circuit to the junction of the second variable electrical element and the second impedance means to form a part of the second arm and electrically interrelated to the first pair of elongated leads to provide a lead to lead capacitance in parallel with said second variable electrical element and thereby effect capacitance balance for the capacitive effects of said variable element for balancing out of variations in said first variable element.

References Cited by the Examiner

UNITED STATES PATENTS

| | | | |
|---|---|---|---|
| 2,309,490 | 1/1943 | Young | 324—57 |
| 2,718,620 | 9/1955 | Howe | 323—75 X |
| 2,891,218 | 6/1959 | Werts | 324—62 |

OTHER REFERENCES

"Electrical Measurements," by Laws, first edition, 1917, pages 226 and 227.

WALTER L. CARLSON, *Primary Examiner.*

SAMUEL BERNSTEIN, *Examiner.*